United States Patent
Kim

(10) Patent No.: US 9,746,972 B2
(45) Date of Patent: Aug. 29, 2017

(54) DISPLAY DEVICE WITH DRIVING ELECTRODE AND RECEIVING ELECTRODE FOR TOUCH SENSING AND DRIVING METHOD THEREOF

(71) Applicant: LG Display Co., Ltd., Seoul (KR)

(72) Inventor: Hoon Bae Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 499 days.

(21) Appl. No.: 14/456,072

(22) Filed: Aug. 11, 2014

(65) Prior Publication Data

US 2015/0062034 A1  Mar. 5, 2015

(30) Foreign Application Priority Data

Aug. 30, 2013 (KR) .......................... 10-2013-0103802

(51) Int. Cl.
*G06F 3/041* (2006.01)
*G06F 3/044* (2006.01)
*G09G 3/36* (2006.01)

(52) U.S. Cl.
CPC ............ *G06F 3/044* (2013.01); *G06F 3/0416* (2013.01); *G09G 3/3677* (2013.01); *G09G 2310/0224* (2013.01); *G09G 2310/08* (2013.01)

(58) Field of Classification Search
CPC .................. G06F 3/0416; G06F 3/044; G09G 2310/0224; G09G 2310/08; G09G 2310/3677
See application file for complete search history.

(56) References Cited

U.S. PATENT DOCUMENTS

| | | | |
|---|---|---|---|
| 7,859,521 B2 | 12/2010 | Hotelling et al. | |
| 2008/0018613 A1 | 1/2008 | Kim et al. | |
| 2012/0050217 A1 | 3/2012 | Noguchi et al. | |
| 2012/0056835 A1* | 3/2012 | Choo ................... | G06F 3/0412 345/173 |
| 2013/0038570 A1* | 2/2013 | Seo ....................... | G06F 3/0416 345/174 |
| 2013/0082954 A1 | 4/2013 | Azumi et al. | |
| 2013/0314361 A1 | 11/2013 | Saitoh et al. | |
| 2013/0335366 A1* | 12/2013 | Lee ........................ | G06F 3/044 345/174 |
| 2014/0184534 A1 | 7/2014 | Lee et al. | |

FOREIGN PATENT DOCUMENTS

EP 2447814 A2 5/2012

* cited by examiner

*Primary Examiner* — Ram Mistry
(74) *Attorney, Agent, or Firm* — Morgan, Lewis & Bockius LLP

(57) ABSTRACT

A display device includes a panel comprising a plurality of driving electrodes and a plurality of receiving electrodes; a panel driver sequentially supplying a scan pulse to a plurality of gate lines corresponding to a first driving electrode of the plurality of driving electrodes, and after a touch sensing period, sequentially supplying a scan pulse to a plurality of gate lines corresponding to a second driving electrode of the plurality of driving electrodes, wherein the panel driver repeatedly performs the sequentially supplying of the scan pulse; and a touch sensing unit sequentially supplying a driving voltage to at least two or more of the plurality of driving electrodes to determine whether there is a touch during the touch sensing period.

8 Claims, 14 Drawing Sheets

DISPLAY DEVICE WITH DRIVING ELECTRODE AND RECEIVING ELECTRODE FOR TOUCH SENSING AND DRIVING METHOD THEREOF

CROSS-REFERENCE TO RELATED APPLICATIONS

This application claims the benefit of Korean Patent Application No. 10-2013-0103802 filed on Aug. 30, 2013, which is hereby incorporated by reference as if fully set forth herein.

BACKGROUND OF THE INVENTION

Field of the Invention

The present invention relates to a display device and a driving method thereof, and more particularly, to a display device including a panel with a built-in touch panel and a method of driving the same.

Discussion of the Related Art

Touch panels are a type of input device that is included in display devices such as liquid crystal display (LCD) devices, plasma display panels (PDPs), organic light emitting display device (OLED), and electrophoretic displays (EPDs), and enables a user to input information by directly touching a screen with a finger, a pen or the like while looking at the screen of the display device.

Particularly, the demand of display devices with integrated in-cell type touch screen, which include a plurality of built-in elements configuring the touch screen for slimming portable terminals such as smart phones and tablet Personal Computers (PCs), is recently increasing.

In an in-cell type display device, as disclosed in U.S. Pat. No. 7,859,521, a plurality of common electrodes for display are segmented into a plurality of touch driving areas and touch sensing areas. An in-cell type display device allows a mutual capacitance to be generated between the touch driving area and the touch sensing area, and thus, measures the change in a mutual capacitance that occurs in touch to determine whether there is a touch.

In other words, in the related art in-cell type display device, a plurality of common electrodes for displaying an image perform the function of a touch electrode when a panel operates in a touch sensing mode, for simultaneously performing a display function and a touch function.

As described above, in a related art in-cell type mutual capacitive display device using the common electrode, the common electrode is used as a driving electrode and a receiving electrode that are necessary for touch sensing, and an image display period and a touch sensing period are temporally divided.

Therefore, in the image display period, a driving electrode and a receiving electrode act as a common electrode. In the touch sensing period, a periodic driving pulse is applied to the driving electrode, and a touch IC determines whether there is a touch by using a sensing signal that is received through the receiving electrode.

FIG. 1 is a waveform diagram showing an image display period and a touch sensing period in a related art in-cell type display device.

In the related art in-cell type display device, as described above and as shown in FIG. 1, a period (hereinafter simply referred to one frame period) corresponding to one frame is divided into an image display period (Display) and a touch sensing period (Touch).

A touch panel applied to a related art in-cell type display device includes a touch electrode to which a common voltage is supplied for an image display period and a driving voltage is supplied for a touch sensing period, and a receiving electrode to which the common voltage is supplied for an image display period and a reference voltage is supplied for a touch sensing period.

For the image display period, the common voltage is supplied to the driving electrode and the receiving electrode. In the touch sensing period, the driving voltage is supplied to the driving electrode, and the reference voltage is supplied to the receiving electrode.

In this case, when one frame period starts, the image display period is first performed, and after the image display period, the touch sensing period is performed. But, the image display period and the touch sensing period may be exchanged.

The above-described in-cell type display devices of the related art have the following problems.

In the related art in-cell type display device, as described above, the touch sensing period for sensing a touch is limited because the image display period is executed after the image display period elapses in one frame period. For example, in a related art in-cell type device which is driven at 60 Hz, sixty images are outputted by using sixty frames for one second, and a sixty-time touch is sensed.

Therefore, in order to sense a touch at a high speed (i.e., at 100 Hz or more), a driving frequency itself of the in-cell type display device should be changed. To this end, a whole configuration of the in-cell type display device should be changed, and thus, it is difficult to actually realize the change.

To provide an additional description, because most of display devices which are recently supplied are configured with a touch panel and all operations of the display devices are driven by a touch, the quick determination of a touch is an important issue.

However, in the related of in-cell type display device, one frame period is divided into an image display period and a touch sensing period, and the touch sensing period is executed after the image display period elapses. Therefore, in one frame period, determining whether there is a touch is performed only one time, and thus, the quick determination of a touch cannot be performed.

SUMMARY OF THE INVENTION

Accordingly, the present invention is directed to a display device and driving method thereof including the same that substantially obviate one or more problems due to limitations and disadvantages of the related art.

An object of the present invention is to provide a display device and a driving method thereof, which input a scan signal to gate lines corresponding to one driving electrode, and then, sequentially input a driving voltage to two or more driving electrodes.

Additional advantages and features of the invention will be set forth in the description which follows, and in part will be apparent from the description, or may be learned by practice of the invention. The objectives and other advantages of the invention may be realized and attained by the structure particularly pointed out in the written description and claims hereof as well as the appended drawings.

To achieve these and other advantages and in accordance with the purpose of the present invention, as embodied and broadly described herein, a display device includes: a panel comprising a plurality of driving electrodes and a plurality of receiving electrodes; a panel driver sequentially supplying a scan pulse to a plurality of gate lines corresponding to a first driving electrode of the plurality of driving electrodes, and after a touch sensing period, sequentially supplying a scan pulse to a plurality of gate lines corresponding to a second driving electrode of the plurality of driving electrodes, wherein the panel driver repeatedly performs the sequentially supplying of the scan pulse; and a touch sensing unit sequentially supplying a driving voltage to at least two or more of the plurality of driving electrodes to determine whether there is a touch during the touch sensing period.

In another aspect, a method of driving a display device includes: sequentially supplying a scan pulse to a plurality of gate lines, corresponding to one of a plurality of driving electrodes which are formed in a panel, during an image display period; when a touch sensing period arrives after the image display period, sequentially supplying a driving voltage to at least two or more of the plurality of driving electrodes; and repeatedly performing the sequentially supplying of the scan pulse and the sequentially supplying of the driving voltage during one frame period to supply the scan pulse to all gate lines which are formed in the panel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, embodiments of the present invention will be described in detail with reference to the accompanying drawings. Hereinafter, for convenience of description, an LCD device will be described as an example of the present invention, but the present invention is not limited thereto. That is, the present invention may be applied to various display devices that display an image by using a common electrode and a common voltage.

Figure 1:
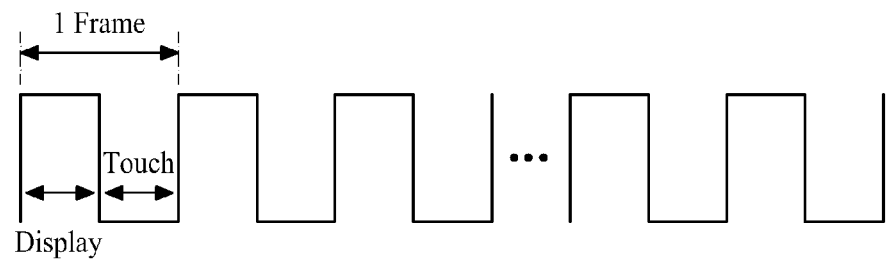
FIG. 1 is a waveform diagram showing an image display period and a touch sensing period in a related art in-cell type display device.
Figure 2:
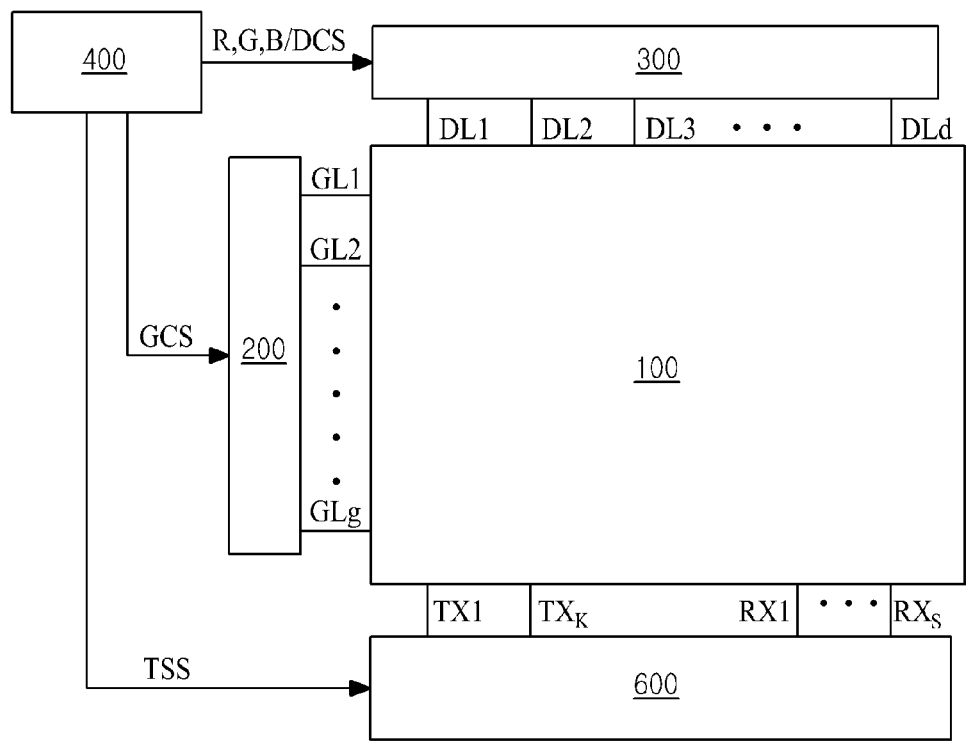
FIG. 2 is an exemplary diagram schematically illustrating a configuration of a display device according to an embodiment of the present invention.
Figure 3:
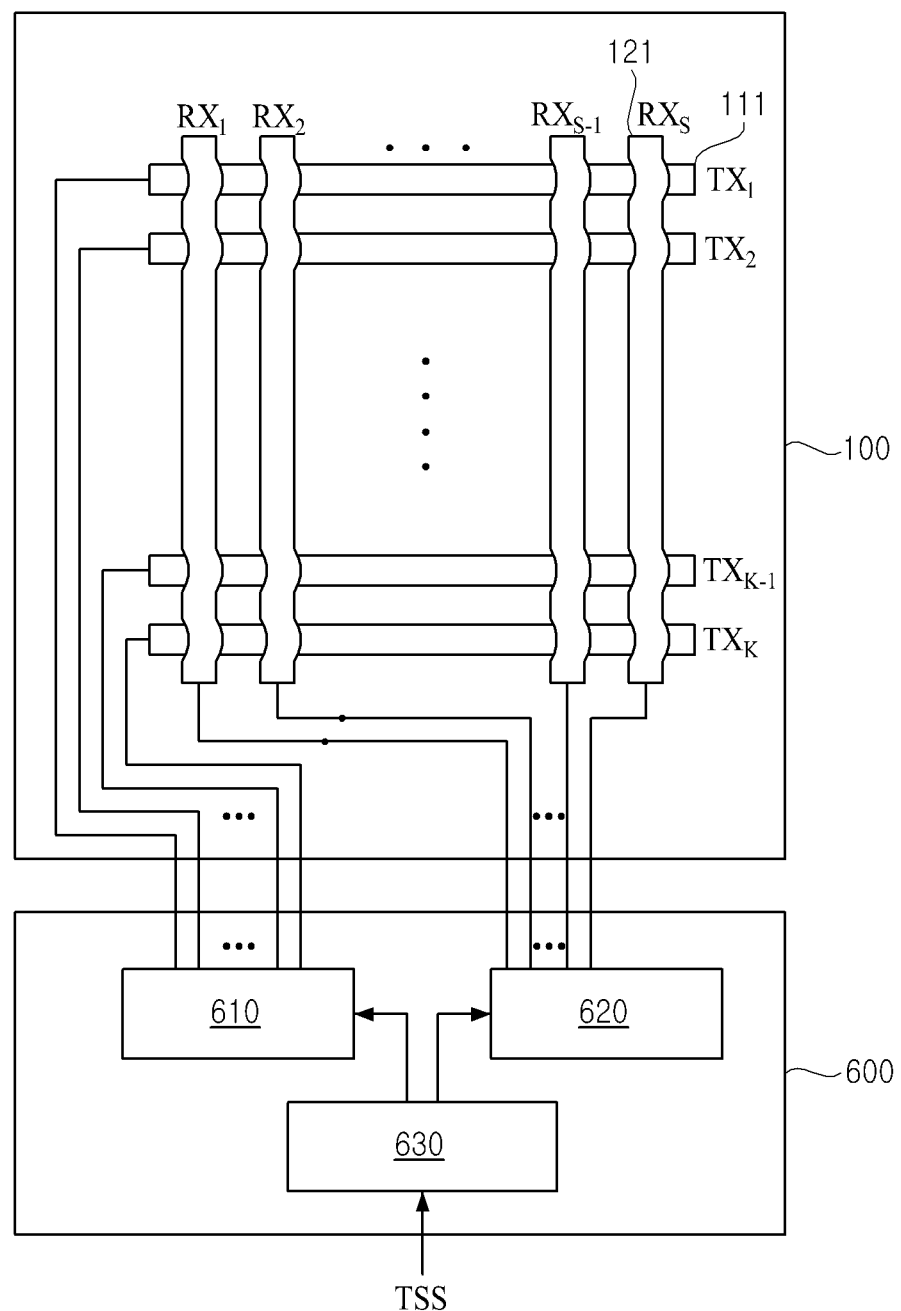
FIG. 3 is an exemplary diagram schematically illustrating a configuration of a panel and a touch sensing unit applied to a display device according to an embodiment of the present invention.
Figure 4:
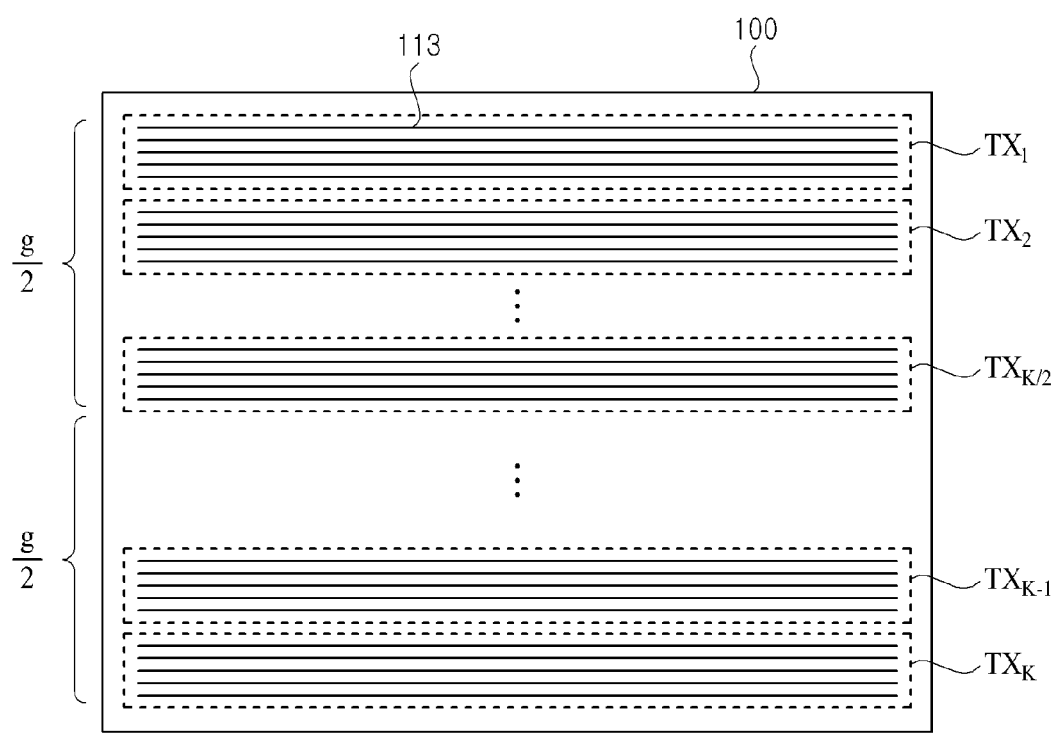
FIG. 4 is an exemplary diagram schematically illustrating a panel of a display device according to an embodiment of the present invention.

FIG. 2 is an exemplary diagram schematically illustrating a configuration of a display device according to an embodiment of the present invention, FIG. 3 is an exemplary diagram schematically illustrating a configuration of a panel and a touch sensing unit applied to a display device according to an embodiment of the present invention, FIG. 4 is an exemplary diagram schematically illustrating a panel of a display device according to an embodiment of the present invention.

The display device, as illustrated in FIGS. 2 and 3, includes a panel 100 comprising a plurality of driving electrodes 111 and a plurality of receiving electrodes 121, a panel driver sequentially supplying a scan pulse to gate lines corresponding to a scan driving electrode among the driving electrodes 111, and after a touch sensing period, sequentially supplying a scan pulse to gate lines corresponding to another scan driving electrode among the driving electrodes 111, and repeatedly performing the processes, and a touch sensing unit 600 sequentially supplying a driving voltage to the at least two driving electrodes of the driving electrodes 111 to determine whether there is a touch during the touch sensing period.

The panel 100 may include a color filter substrate (not shown), a thin film transistor (TFT) substrate in which the gate lines GL1 to Glg and the data lines DL1 to DLd are formed, and liquid crystal (not shown) injected between the color filter substrate and the TFT substrate.

A touch panel, which includes the driving electrode 111 and the receiving electrode 121, is built into the panel 100.

The touch panel according to an embodiment of the present invention may use a capacitive type, and especially is built into the panel 100. The touch panel built into the panel 100 may be divided into a hybrid in-cell type and an in-cell type.

The hybrid in-cell type touch panel may include a plurality of driving electrodes (TX1 to TXk) 111, which are formed in the TFT substrate 110 or the color filter substrate 120 and are formed in parallel with a plurality of the gate lines 113 formed one the TFT substrate 110, and a plurality of receiving electrodes (RX1 to RXs) 121 which are formed in an upper end surface of the color filter substrate with an insulation layer between the driving electrodes and the receiving electrodes. However, the receiving electrodes may be formed in the TFT substrate or the color filter substrate, and the driving electrodes may be formed in an upper end surface of the color filter substrate. For example, at least one of a first group configured with the driving electrodes TX1 to TXk and a second group configured with the receiving electrodes RX1 to RXs may be disposed on the TFT substrate 110 or the color filter substrate 120, and the other may be disposed in an upper surface of the color filter substrate.

The in-cell type touch panel includes the driving electrodes 111 and the receiving electrodes 121, which are formed on the TFT substrate 110. That is, the driving electrodes 111 and the receiving electrodes 121 are formed on the TFT substrate 110. In particular, the driving electrodes 111 and the receiving electrodes 121 may be formed on the same layer of the TFT substrate 110. In this case, the driving electrode or the receiving electrode is connected to another layer through a contact hole, in an intersection area of the driving electrode and the receiving electrode, and thus, the driving electrode and the receiving electrode do not substantially contact each other. Therefore, the driving electrodes and the receiving electrodes may be formed on the TFT substrate by using various methods satisfying the above-described structure.

That is, the panel 100 includes the hybrid in-cell type touch panel or the in-cell type touch panel.

The driving electrodes 111 and the gate lines 113 are formed in the touch panel 100 in a state of being separated from each other by an insulation layer therebetween.

The number of the gate lines 113 and the number of the driving electrodes 111 may be variously set according to a size and a resolution of the panel.

In the following description, for convenience of description, as illustrated in FIG. 4, the panel 100 in which k number of driving electrodes (TX1 to TXk) 111 and g number of gate lines (GL1 to GLg) 113 are formed will be described as an example of the present invention. In this case, one driving electrode 111 is formed in the panel so as to correspond to five gate lines 113. Also, In FIG. 4, g/2 denotes half of the total number of gate lines. That is, g/2 number of gate lines are formed in an area which correspond to a middle portion between an upper end and a lower end of the panel 100, and g/2 of gate lines are formed under the middle portion.

Among the driving electrodes 111, a driving electrode 111 corresponding to the gate lines to which the scan pulse is supplied is referred to as a scan driving electrode 111. The common voltage is supplied to the scan driving electrode 111.

For example, in FIG. 4, if the scan pulse is supplied to at least one of five gate lines corresponding to the first driving electrode TX1, the first driving electrode TX1 becomes the scan driving electrode 111. In this case, the common voltage is supplied to the first driving electrode TX1.

As illustrated in FIG. 2, the panel driver includes a data driver 300 which supplies a data voltage to the date data lines DL1 to DLd formed in the panel 100, a gate driver 200 which sequentially supplies the scan pulse to the gate lines 113 formed in the panel 100 when the data volte is being outputted, and a timing controller 400 which controls the data driver 300 and the gate driver 200 while the data voltage outputs.

First, the timing controller 400 receives a timing signal, including a data enable signal DE, a dot clock CLK, etc., from an external system to generate control signals GCS and DCS for controlling an operation timing of the data driver 300 and the gate driver 200.

Moreover, the timing controller 400 aligns input video data transferred from the external system to supply aligned image data to the data driver 300.

A plurality of the gate control signals GCS generated by the timing controller 400 include a gate start pulse GSP, a gate shift clock GSC, a gate output enable signal GOE, etc.

A plurality of the data control signals DCS generated by the timing controller 400 include a source start pulse SSP, a source shift clock signal SSC, a source output enable signal SOE, a polarity control signal POL, etc.

Moreover, the timing controller 400 generates touch control signals for controlling an operating timing of the touch sensing unit 600 to control the touch sensing unit 600.

That is, the timing controller 400 may generate a touch sync signal TSS which allows a plurality of image display periods and a plurality of touch sensing periods to be repeated during one frame period, and transmit the touch sync signal TSS to the touch sensing unit 600. Moreover, the timing controller 400 may directly generate an internal touch sync signal by using the touch sync signal TSS, and transmit the internal touch sync signal to the touch sensing unit 600. In this case, the touch control signals may include the touch sync signal and the internal touch sync signal.

Second, the data driver 300 converts the video data received from the timing controller 400 into analog data voltages, and respectively supplies the data voltages for one horizontal line to the data lines at every one horizontal period where a gate pulse is supplied to one gate line. That is, the data driver 300 converts the video data into the data voltages by using gamma voltages supplied from a gamma voltage generator (not shown), and respectively outputs the data voltages to the data lines.

The data driver 300 shifts a source start pulse supplied from the timing controller 400 according to a source shift clock to generate a sampling signal. Furthermore, the data driver 300 latches the video data RGB, which are inputted based on the source shift clock, according to the sampling signal to convert the video data into the data voltage, and supplies the data voltage to the data lines in units of a horizontal line in response to a source output enable signal.

To this end, the data driver 300 may include a shift register, a latch unit, a digital-to-analog converter (DAC), and an output buffer, or the like.

The shift register generates a sampling signal by using data control signals received from the timing controller 400.

The latch latches the digital image data RGB sequentially received from the timing controller 400, and simultaneously outputs the latched image data to the DAC.

The DAC simultaneously converts the video data, transferred from the latch, into positive or negative data voltages, and outputs the positive or negative data voltages. Specifically, the DAC converts the image data into the positive or negative data voltages by using a gamma voltage supplied from a gamma voltage generator (not shown) according to a polarity control signal POL transferred from the timing controller 400, and outputs the positive or negative data voltages to the respective data lines.

The output buffer outputs the positive or negative data voltages, transferred from the DAC, to the respective data lines DL of the panel 100 according to a source output enable signal transferred from the timing controller.

Third, the gate driver 200 shifts a gate start pulse transferred from the timing controller 400 to sequentially supply a gate pulse having a gate-on voltage Von to the gate lines GL1 to GLg according to a gate shift clock. Furthermore, the gate driver 200 supplies a gate-off voltage Voff to the gate lines GL1 to GLg during a period where the gate pulse having the gate-on voltage Von is not supplied to the gate lines GL1 to GLg.

Hereinabove, the data driver 300, the gate driver 200 and the timing controller 400 have been described as being separately provided. However, at least one of the data driver 300 and the gate driver 200 may be provided as one body with the timing controller.

Next, although not illustrated in the FIGS. 2 and 3, the display device may include a common voltage supply.

The common voltage supply generates the common voltage supplied to the driving electrodes 111 and the receiving electrodes 121, so as to display an image. The common voltage generated from the common voltage supply 800 is supplied to the driving electrodes 111 and the receiving electrodes 121 through the touch sensing unit 600.

Although not illustrated in FIGS. 2 and 3, the display device may include a driving voltage supply.

The driving voltage supply generates the driving voltage supplied to the driving electrodes 111, so as to detect a touch. The driving voltage generated from the driving voltage supply is supplied to the driving electrodes 111 through the touch sensing unit 600.

Although not illustrated in FIGS. 2 and 3, the display device may include a reference voltage supply.

The reference voltage supply supplies the reference voltage to the receiver 620 that configures the touch sensing unit 600.

The receiver 620 determines whether the panel 100 is touched, by using the sensing signal received from the receiving electrode 121 and the reference voltage.

The reference voltage is supplied to the receiver 620, but because the receiver 620 is connected to the receiving electrodes 121, a voltage corresponding to the reference voltage is applied to the receiving electrodes 121 due to the reference voltage supplied to the receiver 620 during the touch sensing period.

Finally, the touch sensing unit 600 detects a user's touch by using the sensing signals (voltage values) received from the receiving electrodes RX1 to RXs. That is, when a driving voltage for detecting a touch is sequentially applied to the driving electrodes TX1 to TXk by the user touching a specific area of the panel 100 with a finger or a pen, the capacitances between the driving electrodes TX1 to TXk and the receiving electrodes RX1 to RXs are changed, and the capacitance changes effect the changes in voltage values (sensing signals) applied to the touch sensing unit 600 through the receiving electrodes 121.

The receiving electrodes 121 are connected to the touch sensing unit 600, and the touch sensing unit 600 determines whether the touch panel 100 is touched, by using by using the changed voltage values (changed sensing signals).

To this end, as illustrated in FIG. 3, the touch sensing unit 600 includes a driver 610 supplying the common voltage to the scan driving electrode corresponding to gate lines to which the scan pulse is supplied during the image display period and sequentially supplying the driving voltage to at least two or more driving electrodes during the touch sensing period; a receiver 620 supplying the common voltage to the receiving electrodes 121 during the image display period and determining whether there is a touch by using a sensing signal transferred from the receiving electrodes 121 during the touch sensing period; and a controller 630 controlling functions of the driver 610 and the receiver 620 by using the touch sync signal TSS received from the timing controller 400 of the panel driver.

Figure 5:
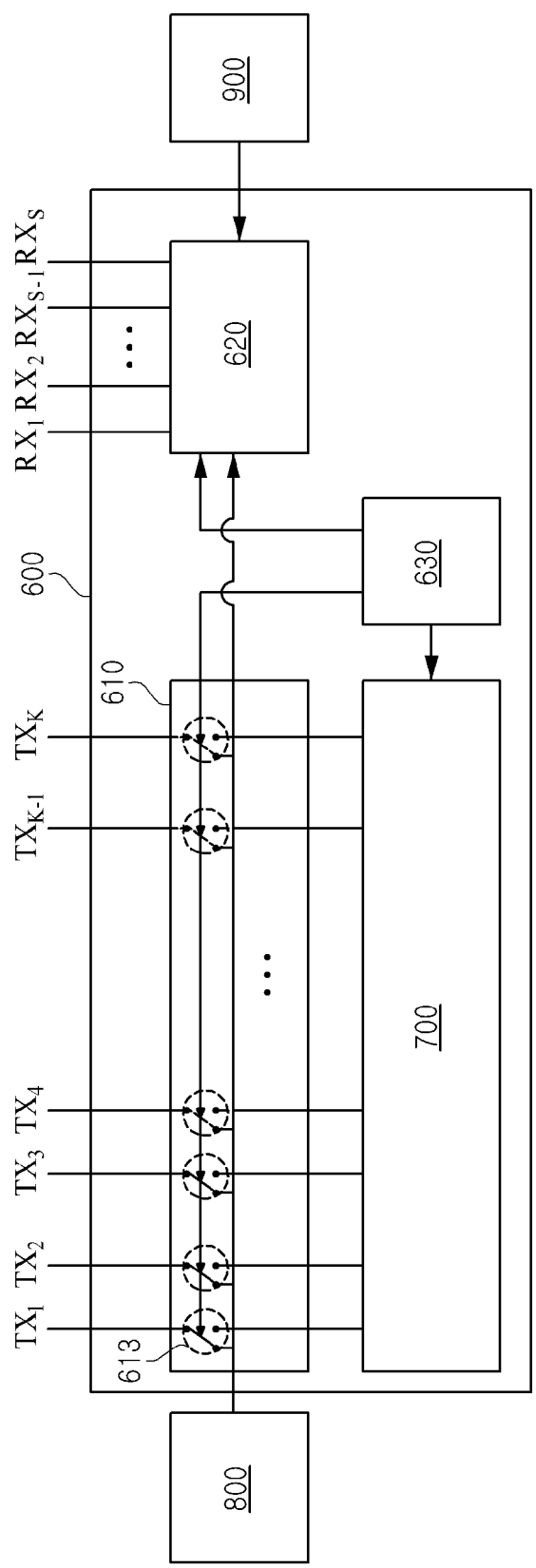
FIG. 5 is an exemplary diagram illustrating a configuration of a touch sensing unit applied to the display device according to the present invention.
Figure 6:
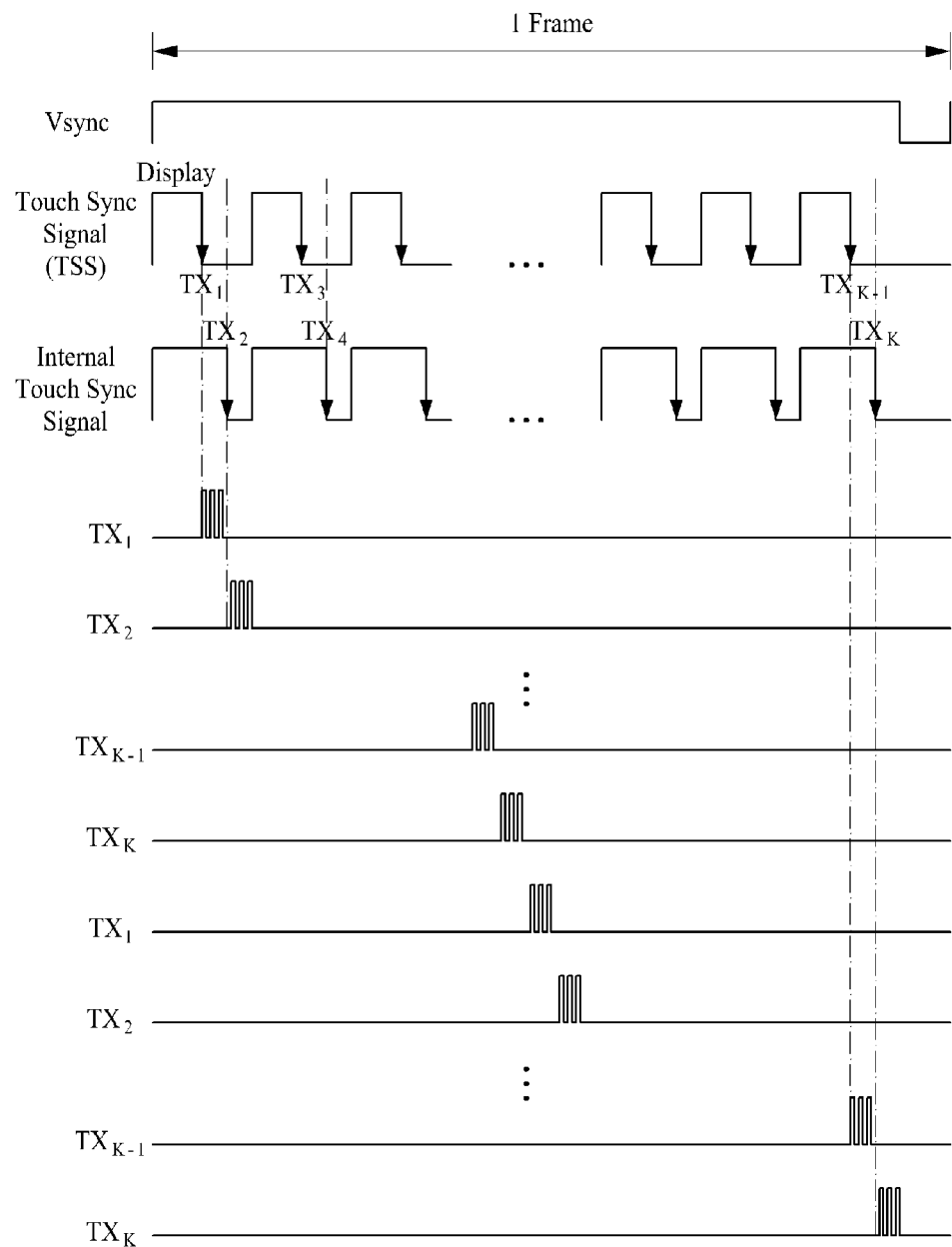
FIG. 6 is an exemplary diagram showing various waveforms applied to the display device according to the present invention.

FIG. 5 is an exemplary diagram illustrating a configuration of a touch sensing unit applied to the display device according to the present invention, and FIG. 6 is an exemplary diagram showing various waveforms applied to the display device according to the present invention.

The touch sensing unit 600 applied to the display device according to embodiments of the present invention, as described above, includes the driver 610, the receiver 620 and the controller 630.

First of all, the driving unit 610 supplies the common voltage to the scan driving electrode corresponding to the gate lines during the image display period in which the scan pulse is supplied to the gate lines 111, and sequentially supplies the driving voltage to at least two or more driving electrodes during the touch sensing period.

For this end, the driver 610 may include a plurality of driver switches 613 which connect each of the driving electrodes TX1 to TXk to the common voltage supply 800 or the driving voltage supply 700.

Each of the driver switches 613 connects each of the driving electrodes to the common voltage supply 800 or the driving voltage supply 700 according to a first switching signal transferred from the controller 630.

Next, the receiver 620 supplies the common voltage to the receiving electrodes during the image display period, and determines whether the panel 100 is touched, by using sensing signals transferred from the receiving signals 121 during the touch sensing period.

To this end, the receiver 620 is connected to the common voltage supply 800 and the reference voltage supply 900, and determines whether there is a touch according to a second switching control signal transferred from the controller 630.

The receiver 620 may include a receiver switch (not shown) which disconnects the common voltage supply 800 from the receiving electrodes 121 during the touch sensing period. In this case, the receiver switch connects the receiving electrodes 121 to the common voltage supply 800 according to the second switching control signal transferred from the controller during the image display period, and disconnects the receiving electrodes 121 from the common voltage supply 800 according to the second switching control signal transferred from the controller 630, during the touch sensing period.

The reference voltage supply 900 may be continuously connected to the receiver 620 during the image display period and the touch sensing period, but may be connected to the receiver 620 only during the touch sensing period. To this end, a reference voltage switch connecting the reference voltage supply 900 to the receiver 620 may be provided in the receiver 620 or the touch sensing unit 600. In this case, the reference voltage switch is turned on according to the second switching signal supplied from the controller 630 during the touch sensing period to connect the reference voltage supply 900 to the receiver 620.

Finally, the controller 630 supplies the first switching signal to the driver 610 and the second switching signal to the receiver 620 when the scan pulse is supplied to the gate lines during the image display period.

All the driver switches 613 may connect the driving electrodes 111 to the common voltage supply 800 according to the first switching signal which is transferred during the image display period. Therefore, the common voltage may be supplied to all the driving electrodes 111 including the scan driving electrode.

However, only the scan driving electrode among the driving electrodes may be connected to the common voltage supply 800 according to the first switching signal.

All the receiver switches (not shown) may connect the receiving electrodes 121 to the common voltage supply 800 according to the second switching signal which is transferred during the image display period.

Moreover, the controller 630 supplies the first switching signal to the driver 610 and supplies the second switching signal to the receiver 620 during the touch sense period.

At least two of the driver switches 613 are sequentially connected to the driving voltage supply 700 according to the first switching signal which is transferred during the touch sensing period, and thus, the driving voltage may be sequentially supplied to at least two of the driving electrodes.

The receiver switches (not shown) are disconnected from the common voltage supply 800 according to the second switching signal which is transferred during the touch sensing period, and connect the receiving electrodes 121 to the receiver 620. Therefore, the receiver 620 receives the sensing signals from the receiving electrodes 121 to determine whether there is a touch.

Here, the controller 630 may generate the first switching signal by using at least one of the inner touch sync signal or the touch sync signal TSS.

First, when only the touch sync signal TSS shown in FIG. 6 is transferred from the timing controller 400, the controller 630 may generate the internal touch sync signal shown in FIG. 6. In FIG. 6, the touch sync signal may swing a certain number of times corresponding to the number of the driving electrodes TX1 to TXk shown in FIG. 4 during one frame period.

The internal touch sync signal may fall after a certain time elapses from a time when the touch sync signal falls, and rise at a time when the touch sync signal rises.

The controller 630 generates the first switching signal by using the internal touch sync signal and the touch sync signal. To this end, the controller 630 may include a shift register for receiving the touch sync signal and the internal touch sync signal to generate the first switching signal.

When the touch sync signal TSS has a high level, namely, during the image display period, the first switching signal may allow only the scan driving electrode to be connected to the common voltage supply unit 800, or allow all the driving electrodes to be connected to the common voltage supply unit 800.

When the touch sync signal TSS has a low level, namely, during the touch sensing period, the first switching signal may allow at least two of the driving electrodes to be sequentially connected to the driving voltage supply unit 700.

To this end, the first switching signal allows the driving voltage to be supplied to one of the at least two or more driving electrodes at a time when the touch sync signal TSS falls, and at a time when the internal touch sync signal falls after the touch sync signal falls, the first switching signal allows the driving voltage to be supplied to the other electrode of the at least two or more driving electrodes. At a time when the touch sync signal rises, the first switching signal allows an output of the driving voltage to be stopped. The first switching signal is transferred to the driver 610.

Figure 7:
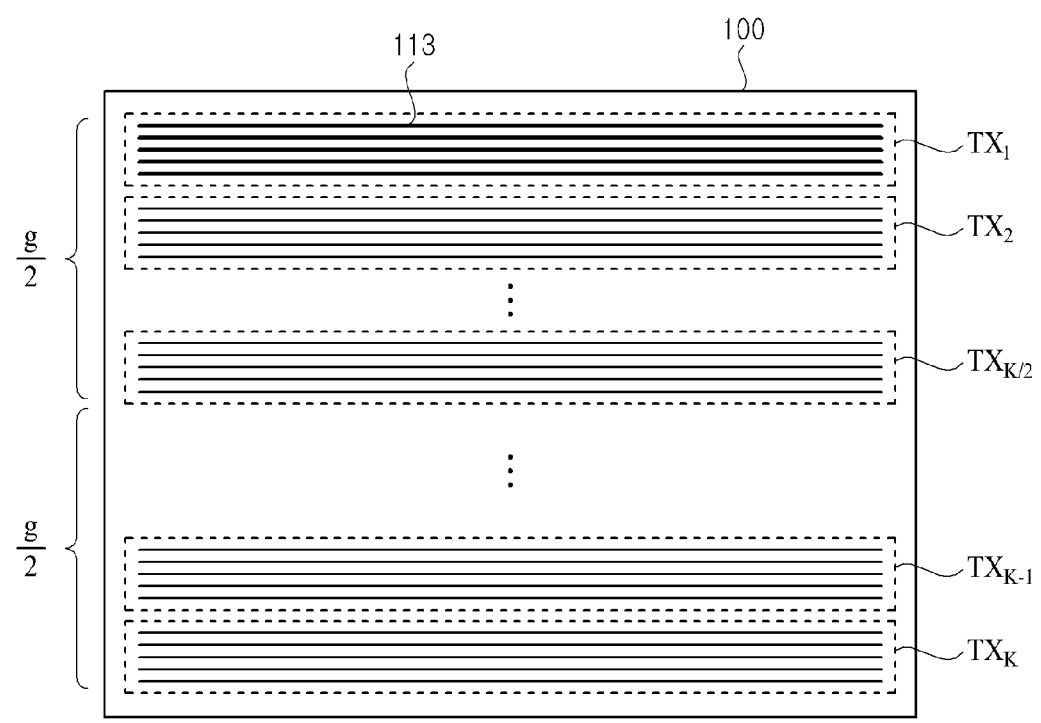
FIGS. 7 to 15 are exemplary diagrams schematically illustrating an embodiment of a method of driving the display device according to the present invention.

That is, as illustrated in FIG. 7, the first switching signal may allow one of the driving electrodes to be connected to the driving voltage supply 700 at every time when the touch sync signal TSS and the internal touch sync signal fall.

In this case, the number of the driving electrodes to which the driving voltage is supplied during the touch sensing period is one more than the number of the internal touch sync signals which fall after the touch sync signal falls.

That is, in FIG. 6, because the internal touch sync signal falls one time after the touch sync signal falls, the number of the driving electrodes to which the driving voltage is supplied during the touch sensing period is two. To provide an additional description, when the first switching signal is generated by the touch sync signal and the internal touch sync signal illustrated in FIG. 6, the driving voltages is sequentially supplied to the two driving electrodes during the touch sensing period.

However, when the internal touch sync signal is a signal which falls twice after the touch sync signal falls, the number of the driving electrodes to which the driving voltage is supplied during the touch sensing period is three.

That is, the number of the driving electrodes to which the driving voltage is supplied during the touch sensing period may be variously provided depending on a form of the internal touch sync signal.

Second, when the touch sync signal TSS and the internal touch sync signal shown in FIG. 6 are transferred from the timing controller 400, the controller 630 generates the first switching signal by using the internal sync signal and the touch sync signal. To this end, the controller may include a shift register for receiving the touch sync signal and the internal touch sync signal to generate the first switching signal. In this case, the configuration of the first switching signal is the same as the above-described description, and thus, its detailed description is not provided.

Third, when only the touch sync signal TSS shown in FIG. 6 is transferred from the timing controller 400, the controller 630 may generate the internal touch sync signal formed having another form by using the internal touch sync signal.

For example, the internal touch sync signal shown in FIG. 6 falls after the touch sync signal falls and the driving voltage is supplied to one of the driving electrodes. However, the controller 630 may generate the internal touch sync signal for which rising and falling are repeated until the touch sync signal rises after the internal touch sync signal falls along with the touch sync signal.

In this case, the controller 630 may generate the first switching signal which allows the driving voltage to be sequentially supplied to the two or more driving electrodes at every time when the internal touch sync signal falls, and transfer the first switching signal to the driver 610.

In this case, the number of the internal touch sync signals which fall may be equal to the number of the driving electrodes to which the driving voltage is supplied.

Fourth, when the internal touch sync signal which is described in the third example is transferred from the timing controller 400, the controller 630 may generate the first switching signal by using the internal touch sync signal having a form described above with reference to the third example.

The driving voltage supply 700, the reference voltage supply 900 and the common voltage supply described above may be formed independently from one another or formed within the touch sensing unit 600.

Moreover, in FIG. 5 and the above-described description, the driver switch 613 which is formed in the touch sensing unit 600 is described, but the driver switch 613 may be formed in the panel driver.

That is, in the display device, the gate driver 200, the data driver and the timing controller 400 configuring the panel driver, as shown in FIG. 2, may be separately provided, but may be integrated into one display driver.

In the liquid crystal display device in which the gate driver 200, the data driver 300 and the timing controller 400 are formed in one display driver, the driver 610 controlling the output of the driving voltage may be formed in the touch sensing unit 600, and the driver switch 613 may be formed the display driver. In this case, the controller 630 may be formed in the display driver.

FIGS. 7 to 15 are exemplary diagrams schematically illustrating an embodiment of a method of driving the display device according to the present invention.

The method of driving the display device according to the present invention includes sequentially supplying a scan pulse to gate lines corresponding to one of driving electrodes formed in a panel during an image display period, sequentially supplying a driving voltage to at least two or more driving electrodes of the driving electrodes, when a touch sensing period arrives after the image display period, and repeatedly performing the process of sequentially supplying the scan pulse and the process of sequentially supplying the driving voltage during one frame period to supply the scan pulse to all of the gate lines formed in the panel.

Hereinafter, with reference to FIGS. 4, 6 and 7 to 15, the method of driving the display device according to the present invention is explained in detail. That is, when the display device according to the present invention is driven by a pulse shown in FIG. 6, the driving voltage is supplied to two driving electrodes during the touch sensing period which arrives after an image display period.

First, with reference to FIG. 7, the scan pulse is supplied to gate lines 113 corresponding to a first driving electrode TX1.

In this case, the panel driver sequentially supplies the scan pulse to the gate lines corresponding to the first driving electrode TX1, and supplies the data voltage to the data lines while the scan pulse is supplied.

The controller 630 of the touch sensing unit 600 supplies the first switching signal and the second switching signal to the driver 610 and the receiver 620.

The driver 610 connects the first driving electrode TX1, that is, the scan driving electrode to the common voltage supply 800 according to the first switching signal. Therefore, the common voltage is supplied to the scan driving electrode.

In this case, the driver 610 may connect only the scan driving electrode to the common voltage supply 800, but connect all of the driving electrodes including the scan driving electrode to the common voltage supply 800.

The receiver 610 connects the receiving electrodes 121 to the common voltage supply according to the second switching signal.

Figure 8:
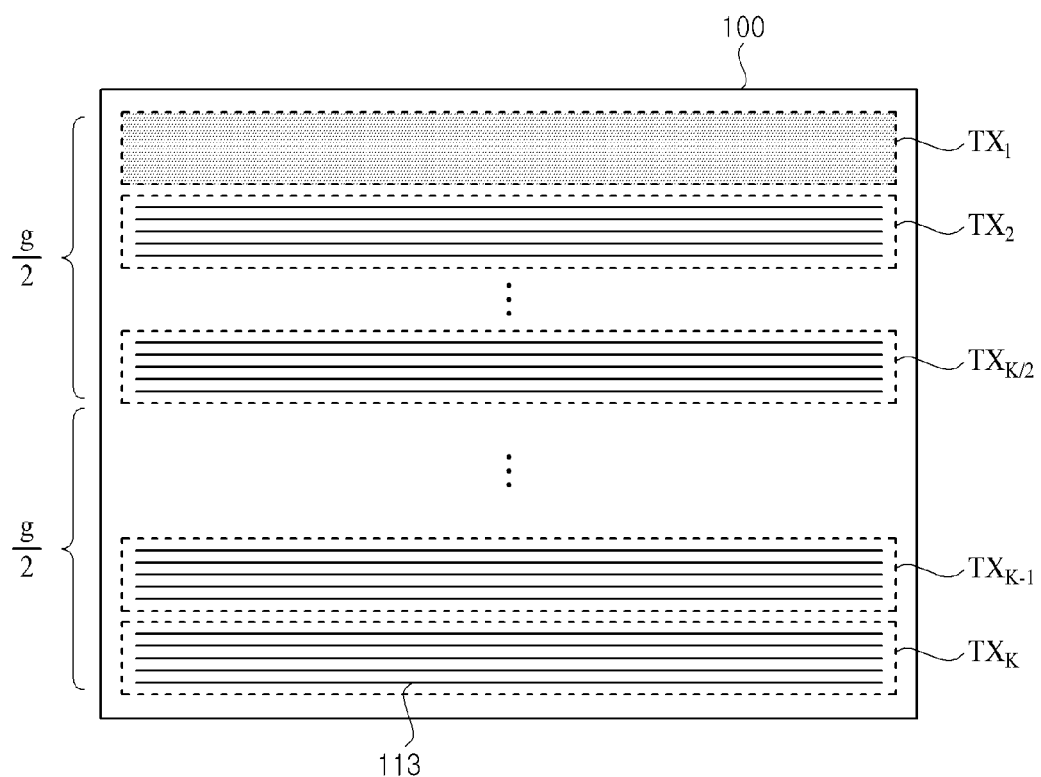

Second, with reference to FIGS. 6 and 8, when the touch sync signal TSS falls, the controller 610 supplies the first switching signal, which allows the first driving electrode TX1 to be connected to the driving electrode supply 700, to the controller 610.

The controller 610 connects the first driving electrode TX1 to the driving voltage supply 700 according to the first switching signal.

Therefore, the driving voltage is supplied to the first driving electrode TX1. That is, during a first touch sensing period, the driving voltage is supplied to the first driving electrode TX1 to which the common voltage is supplied during a first image display period.

In this case, the receiver 610 is connected to the receiving electrodes 121 according to the second switching signal, and then, determines whether the panel 100 is touched, by using the sensing signal received from the receiving electrodes 121.

Moreover, the panel driver does not output the scan pulse and the data voltage to the gate lines and the data lines.

Figure 9:
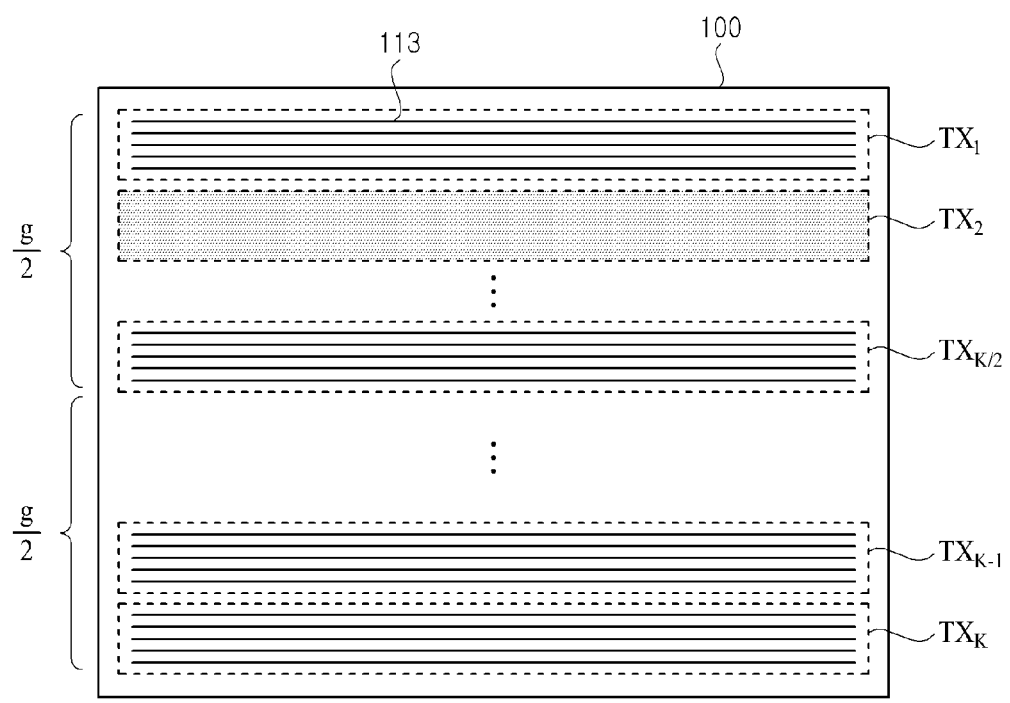

Third, with reference to FIGS. 6 and 9, when the internal touch sync signal falls after the touch sync signal TSS falls, the controller 610 supplies the first switching signal, which allows the second driving electrode TX2 to be connected to the driving voltage supply 700, to the driver 610.

The driver 610 connects the second driving electrode TX2 to the driving voltage supply 700 according to the first switching signal.

Therefore, the driving voltage is supplied to the second driving electrode TX2.

In this case, the receiver 600 is connected to the receiving electrodes 121 according to the second switching signal, and then, determines whether there is a touch by using the sensing signal received from the receiving electrodes 121.

That is, through the second operation and the third operation, determining whether the first driving electrode TX1 and the second driving electrode TX2 are touched is performed.

Fourth, with reference to FIG. 6, the first operation and the third operation are repeatedly performed. Therefore, during the second image display period, the common voltage is supplied to the second touch driving electrode TX2, and the scan pulse is supplied to the gate lines corresponding to the second touch driving electrode TX2.

Moreover, during a second touch sensing period which arrives after the second image display period, the driving voltage is sequentially supplied to the third driving electrode TX3 and the fourth driving electrode TX4, and whether the panel is touched is determined.

Figure 10:
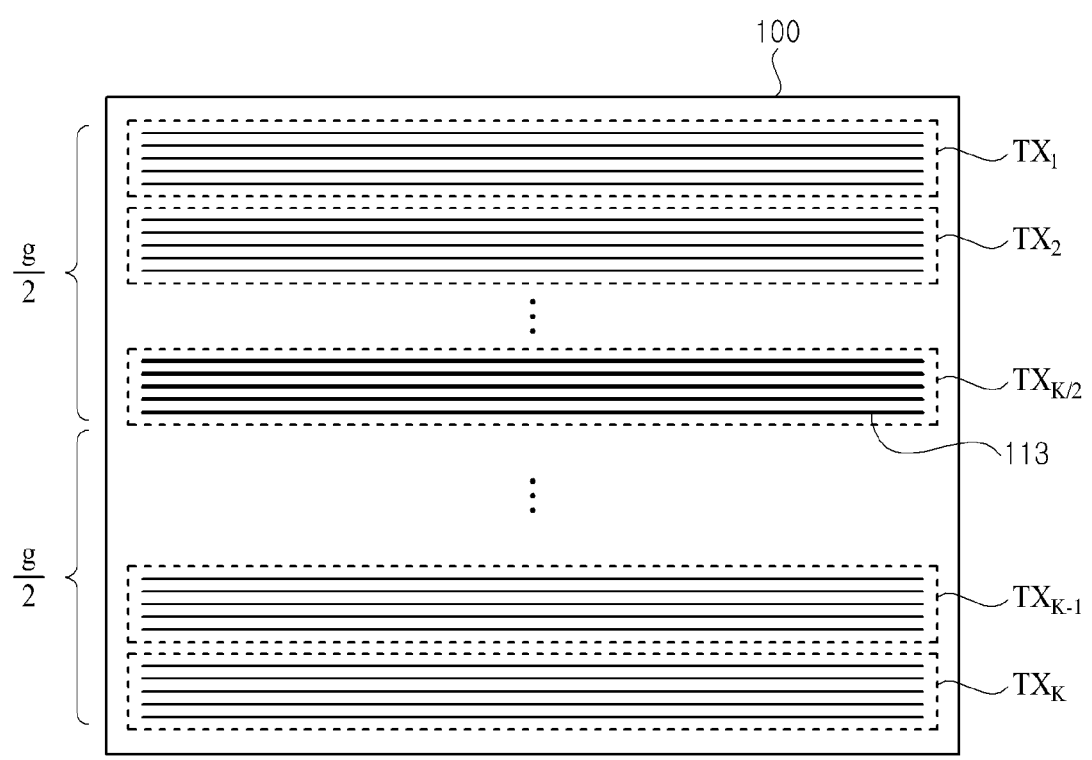

Fifth, with reference to FIGS. 6 and 10, the fourth operation is achieved constantly, and thus, the scan pulse is supplied to the gate lines 113 corresponding to the kth/2 driving electrode TXk/2 of the driving electrodes.

In this case, the panel driver sequentially supplies the scan pulse to the gate lines corresponding to the kth/2 driving electrode TXk/2 and supplies the data voltage to the date lines while the scan pulse is supplied.

The controller 630 of the touch sensing unit 600 supplies the first switching signal and the second switching signal to the driver 610 and the receiver 620.

The driver 610 connects the kth/2 driving electrode TKk/2, that is the scan driving electrode to the common voltage supply 800 according to the first switching signal. Therefore, the common voltage supplied to the scan driving electrode.

In this case, the driver 610 may connect only the scan driving electrode to the common voltage supply 800, but connect all of the driving electrodes including the scan driving electrode to the common voltage supply 800.

The receiver 610 connects the receiving electrodes 121 to the common voltage supply 800 according to the second switching signal.

Figure 11:
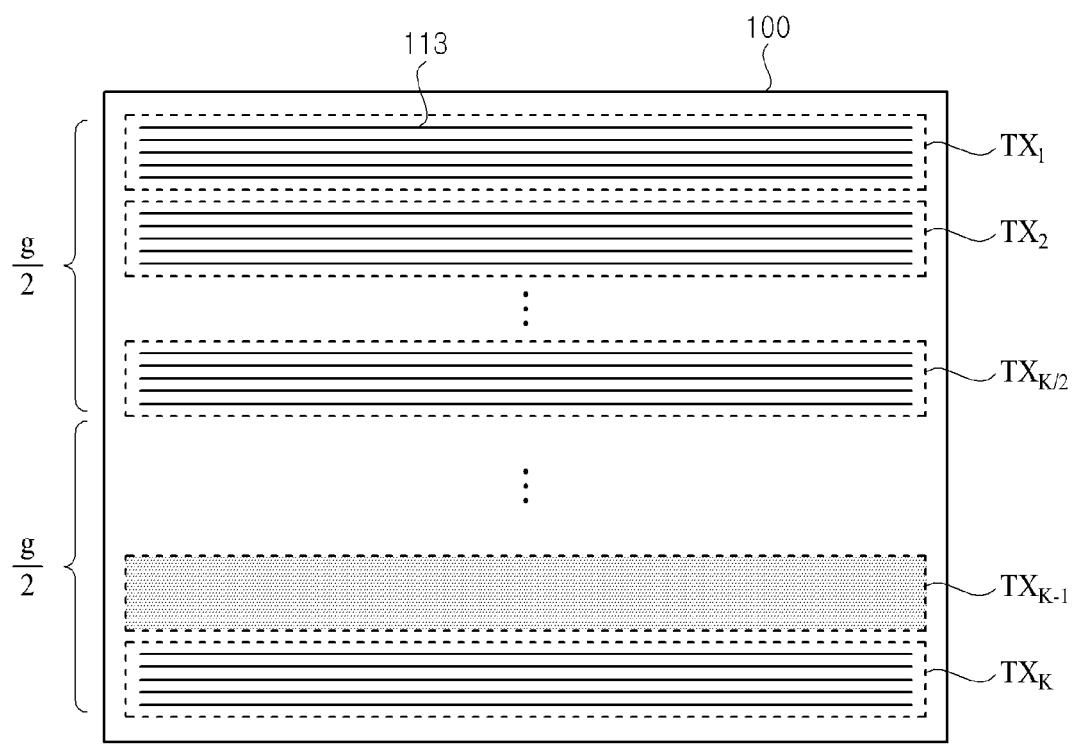

Sixth, with reference to FIGS. 6 and 11, when the touch sync signal falls for the kth/2 time, the controller 610 supplies the first switching signal, which allows a k-1st driving electrode TXk-1 to be connected to the driving voltage supply 700, to the driver 610.

The driver 610 connects the k-1st driving electrode TXk-1 to the driving voltage supply 700 according to the first switching signal.

Therefore, the driving voltage is supplied to the k-1st driving electrode TX1.

In this case, the receiver 610 is connected to the receiving electrode 121 according to the second switching signal, and determines whether the panel 100 is touched, by using the sensing signal received from the receiving electrodes 121.

Moreover, the panel driver does not output the scan pulse and the data voltage to the gate lines and the data lines.

Figure 12:
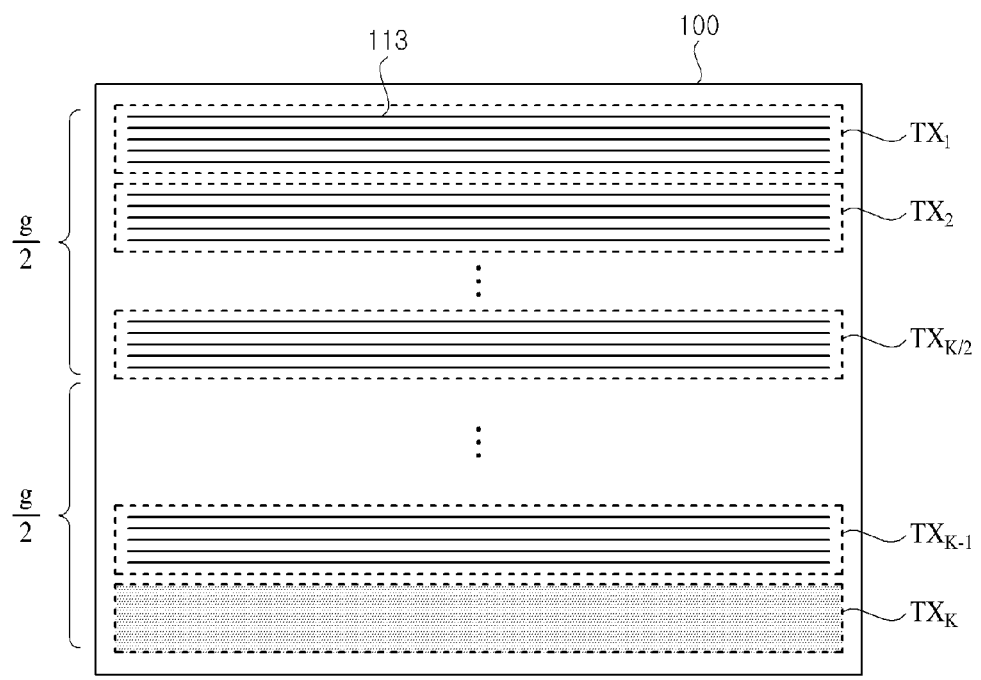

Seventh, with reference to FIGS. 6 and 12, when the internal touch sync signal falls after the touch sync signal TSS falls, the controller 610 supplies the first switch signal, which allows a kth driving electrode TXk to be connected to the driving voltage supply 700, to the driver 610.

The driver 610 connects the kth driving electrode TXk to the driving voltage supply 700 according to the first switching signal.

Therefore, the driving voltage is supplied to the kth driving electrode TXk.

In this case, the receiver 610 is connected to the receiving electrodes 121 according to the second switching signal, and determines whether the panel 100 is touched, by using the sensing signal received from the receiving electrodes 121.

While the first operation to the seventh operation are performed, the scan pulse is supplied to g/2 number of gate lines corresponding to half (½) of the number of the gate lines, and the driving voltage is sequentially supplied to the first to kth driving electrodes TX1 to TXk.

That is, while the scan pulse is supplied to the gate lines equal to half of the number of the gate lines, determining whether the panel 100 is wholly touched is performed.

Eighth, with reference to FIG. 6, while the scan pulse is sequentially supplied to (k/2)+1st to k-1st driving electrodes TX(k/2)+1 to TXk-1, the first to third operations are repeatedly performed. Therefore, the driving voltage is sequentially supplied to the first to k-2nd driving electrode TX1 to TXk-2, and determining whether there is a touch is performed.

Figure 13:
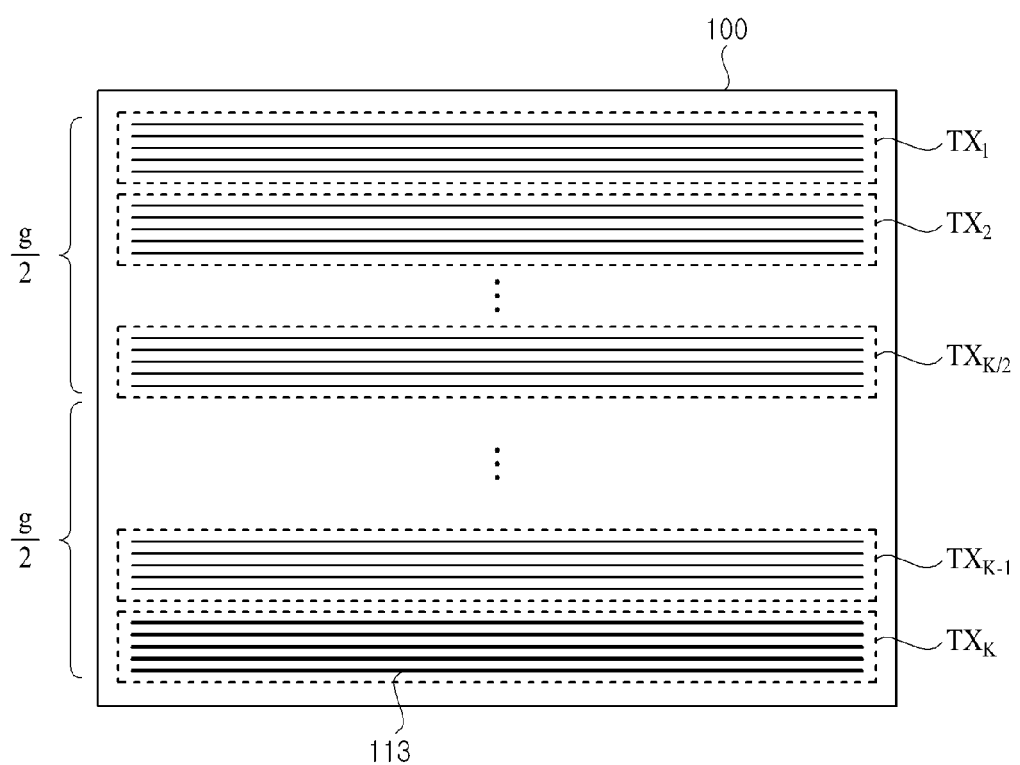

Ninth, with reference to FIGS. 6 and 13, the eighth operation is repeatedly performed, and thus, the scan pulse is supplied to the gate lines 113 corresponding to a kth driving electrode TXk of the driving electrodes.

In this case, the panel driver sequentially supplies the scan pulse to the gate lines corresponding to the kth driving electrode TXk and supplies the data voltage to the data lines while the scan pulse is supplied.

The controller 630 of the touch sensing unit 600 supplies the first switching signal and the second switching signal to the driver 610 and the receiver 620.

The driver 610 connects the kth driving electrode TXk, that is, the scan driving electrode to the common voltage supply 800 according to the first switching signal. Therefore, the common voltage is supplied to the scan driving electrode.

In this case, the driver 610 may connect only the scan driving electrode to the common voltage supply 800, but connect all of the driving electrodes including the scan driving electrode to the common voltage supply 800.

The receiver 610 connects the receiving electrodes 121 to the common voltage supply 800 according to the second switching signal.

Figure 14:
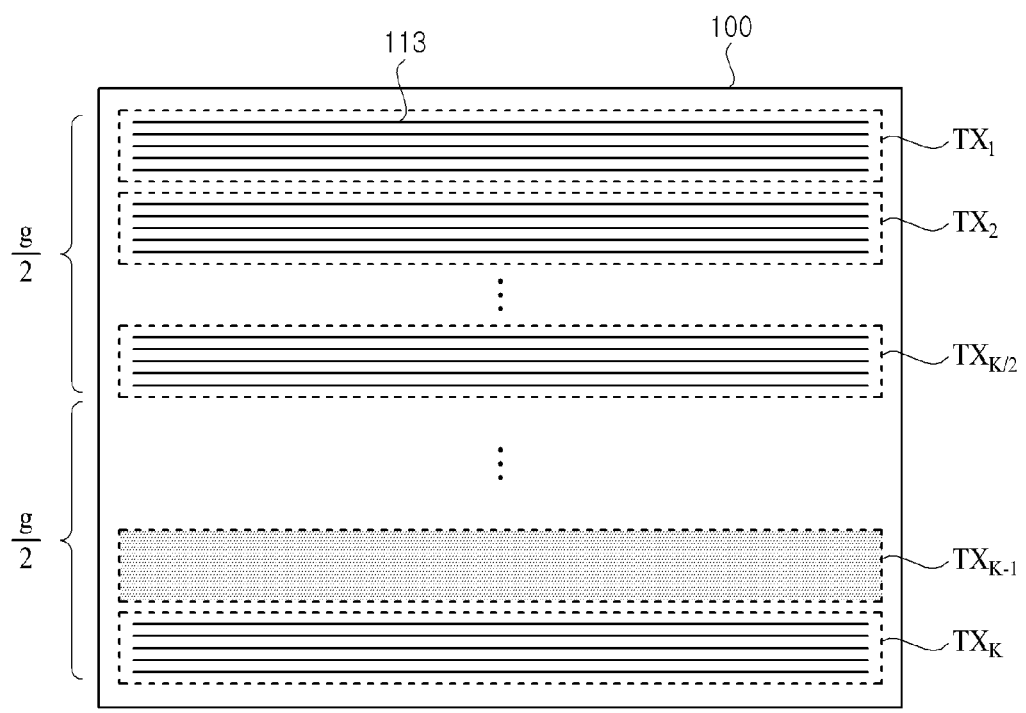

Tenth, reference to FIGS. 6 and 14, when the touch sync signal TSS falls for the kth time, the controller 610 supplies the first switching signal, which allows a k-1st driving electrode TXk-1 to be connected to the driving voltage supply 700, to the driver 610.

The driver 610 connects the k-1st driving electrode TXk-1 to the driving voltage supply 700 according to the first switching signal.

Therefore, the driving voltage is supplied to the k-1st driving electrode TXk-1.

In this case, the receiver 610 is connected to the receiving electrodes 121 according to the second switching signal, and determines whether the panel 100 is touched by using the sensing signal received from the receiving electrodes 121.

Moreover, the panel driver does not output the scan pulse and the data voltage to the gate lines and the data lines.

Figure 15:
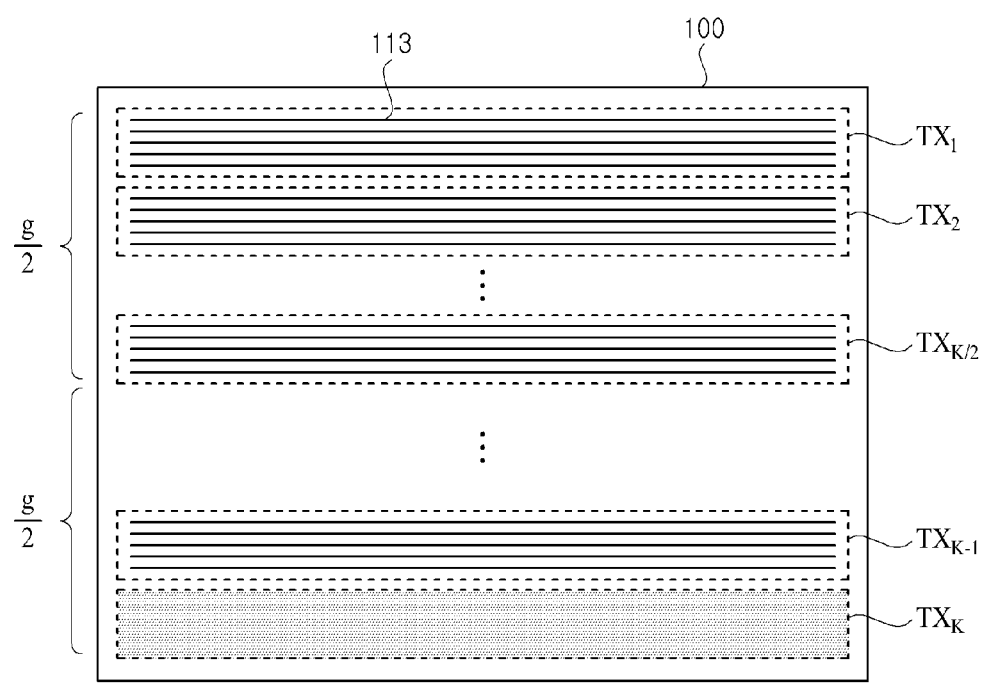

Eleventh, with reference to FIGS. 6 and 15, when the internal touch sync signal falls after the touch sync signal falls, the controller 610 supplies the first switching signal, which allows a kth driving electrode to be connected to the driving voltage supply 700, to the driver 610.

The driver 610 connects the kth driving electrode TXk to the driving voltage supply 700 according to the first switching signal.

Therefore, the driving voltage is supplied to the kth driving electrode TXk.

In this case, the controller 610 is connected to the receiving electrodes 121 according to the second switching signal and determines whether the panel 100 is touched, by using the sensing signal received from the receiving electrodes 121.

While the eighth to eleventh operations are performed, the scan pulse is supplied to g/2 number of gate lines equal to half (½) of the number of the gate lines, and the driving voltage is sequentially supplied to the first to kth driving electrode TX1 to TXk.

That is, while the scan pulse is supplied to the other half of the gate lines, determining whether the panel 100 is wholly touched is performed once again.

To provide an additional description, as illustrated in FIGS. 7 and 12, when the scan pulse is supplied to the gate lines corresponding to the first to kth/2 driving electrode TX1 to TXk/2, whether the panel 100 is wholly touched is determined once. That is, while the scan pulse is supplied to g/2 number of gate lines, whether there is a touch is determined once.

Moreover, as illustrated in FIGS. 13 and 15, while the scan pulse is supplied to the gate lines corresponding to the (k/2)+1st to kth driving electrodes TX(k/2)+1 to TXk, whether the panel 100 is wholly touched is determined once again. That is, while the scan pulse is supplied to the other g/2 gate lines, whether there is a touch is determined once again.

Therefore, while the scan pulse is sequentially supplied to all the gate lines which are formed in the panel 100, whether the panel 100 is wholly touched is determined twice.

That is, according to embodiments of the present invention, while one image is output through the panel 100, whether there is a touch is determined twice.

In the above-described embodiment, the method in which determining whether there is a touch is performed twice during one frame is described as an example of the present invention, but the present invention is not limited to this.

That is, as illustrated in FIG. 6, when the internal touch sync signal falls once during the touch sensing period, whether there is a touch is determined twice during one frame period, and when the internal touch sync signal falls twice during the touch sensing period, whether there is a touch may be determined three times during one frame period. When the internal touch sync signal falls three times during the touch sensing period, whether there is a touch may be determined four times during one frame period. Therefore, the number of touch determinations may be variously set depending on a waveform of the internal touch sync signal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

According to the present invention, determining whether there is a touch may be performed at least twice or more during one frame period, ant thus, touch sensing efficiency can be enhanced.

Moreover, according to the present invention, the number of gate lines which are driven during the image display period is equal to the number of gate lines corresponding to one driving electrode, and thus, an image output error rate and a touch sensing error rate may be reduced.

It will be apparent to those skilled in the art that various modifications and variations can be made in the present invention without departing from the spirit or scope of the inventions. Thus, it is intended that the present invention cover the modifications and variations of this invention provided they come within the scope of the appended claims and their equivalents.

What is claimed is:

1. A display device, comprising:
   a panel comprising:
      a thin film transistor substrate comprising gate lines and data lines;
      a plurality of driving electrodes and a plurality of receiving electrodes, the plurality of driving electrodes being in parallel with the gate lines, such that:
         a first plurality of gate lines corresponds to a first driving electrode among the plurality of driving electrodes; and
         a second plurality of gate lines corresponds to a second driving electrode among the plurality of driving electrodes; and
      an insulation layer separating the gate lines and the driving electrodes;
   a panel driver configured to:
      sequentially supply a scan pulse to the first plurality of gate lines during one of a plurality of display periods;
      after a touch sensing period, sequentially supply a scan pulse to the second plurality of gate lines during another one of the plurality of display periods; and
      repeatedly perform the sequentially supplying of the scan pulse;
   a touch sensing unit comprising a driver, the touch sensing unit being configured to:
      sequentially supply a driving voltage to at least the first driving electrode and the second driving electrode among the plurality of driving electrodes to determine whether there is a touch during the touch sensing period;
      generate an internal touch sync signal by using a touch sync signal; and
      transfer a switching signal, which allows the driving voltage to be sequentially supplied to at least the first driving electrode and the second driving electrode of the plurality of driving electrode, to the driver at each time when the internal touch sync signal falls;
   a common voltage supply configured to generate a common voltage; and
   a driving voltage supply configured to generate the driving voltage,
   wherein the driver comprises a plurality of driver switches configured to connect each of the driving electrodes to the common voltage supply or the driving voltage supply according to the switching signal,
   wherein, according to the switching signal, at least two of the driver switches are sequentially connected to the driving voltage supply during the touch sensing period, and
   wherein, according to the switching signal, a driver switch, connected to a driving electrode corresponding to gate lines to which the scan pulse is supplied, is connected to the common voltage supply during an image display period.

2. The display device of claim 1, wherein the panel driver is further configured to repeatedly perform the sequentially supplying of the scan pulse during one frame period to supply the scan pulse to all gate lines in the panel.

3. The display device of claim 1, wherein:
   the panel driver is further configured to supply the scan pulse to each of the gate lines one time during one frame period; and
   the touch sensing unit is further configured to supply the driving voltage to each of the driving electrodes at least two or more times during the one frame period.

4. The display device of claim 1, wherein the touch sensing unit further comprises:
   a receiver configured to:
      supply the common voltage to the plurality of receiving electrodes during the image display period; and
      determine whether a panel is touched, by using a plurality of sensing signals transferred from the plurality of receiving electrodes during the touch sensing period; and
   a controller configured to control functions of the driver and the receiver by using a touch sync signal received from the panel driver.

5. The display device of claim 1, wherein:
   at a time when a touch sync signal received from the panel driver falls, the touch sensing unit is further configured to supply the driving voltage to one of at least the first driving electrode and the second driving electrode among the plurality of driving electrodes,
   at a time when an internal touch sync signal falls after the touch sync signal falls, the touch sensing unit is further configured to supply the driving voltage to the other driving electrode of at least the first driving electrode and the second driving electrode among the plurality of driving electrodes, and
   at a time when the touch sync signal rises, the touch sensing unit is further configured to stop an output of the driving voltage.

6. The display device of claim 5, wherein the number of the driving electrodes, to which the driving voltage is supplied during the touch sensing period, is one more than a number of times the internal touch sync signal falls after the touch sync signal falls, and before the touch sync signal rises again.

7. The display device of claim 5, wherein the internal touch sync signal is transferred from the panel driver, or is generated by the touch sensing unit by using the touch sync signal.

8. A method of driving a display device, comprising:
   the display device, comprising:
      a panel comprising:
         a thin film transistor substrate comprising gate lines and data lines;
         a plurality of driving electrodes and a plurality of receiving electrodes, the plurality of driving electrodes being in parallel with the gate lines, such that a first plurality of gate lines corresponds to a first driving electrode of the plurality of driving electrodes and a second plurality of gate lines corresponds to a second driving electrode of the plurality of driving electrodes;
         an insulation layer separating the gate lines and the driving electrodes;
      a common voltage supply configured to generate a common voltage; and
      a driving voltage supply configured to generate the driving voltage;
   a panel driver configured to:
      sequentially supply a scan pulse to the first plurality of gate lines during one of a plurality of display periods;
      after a touch sensing period, sequentially supply a scan pulse to the second plurality of gate lines during another one of the plurality of display periods; and repeatedly perform the sequentially supplying of the scan pulse;

a touch sensing unit comprising a driver, the touch sensing unit being configured to:

sequentially supply a driving voltage to at least the first driving electrode and the second driving electrode among the plurality of driving electrodes to determine whether there is a touch during the touch sensing period;

generate an internal touch sync signal by using a touch sync signal; and transfer a switching signal, which allows the driving voltage to be sequentially supplied to at least the first driving electrode and the second driving electrode among the plurality of driving electrodes, to the driver at every time when the internal touch sync signal falls;

the method comprising:

sequentially supplying a scan pulse to the first plurality of gate lines, corresponding to the first driving electrode among the plurality of driving electrodes during one of a plurality of an image display period;

when a touch sensing period arrives after the one of the plurality of display periods the image display period, sequentially supplying, by a touch sensing unit, a driving voltage to at least the first driving electrode and the second driving electrode among the plurality of driving electrodes; and repeatedly performing the sequentially supplying of the scan pulse and the sequentially supplying of the driving voltage during one frame period to supply the scan pulse to all gate lines, wherein the touch sensing unit:

generates an internal touch sync signal by using a touch sync signal, and transfers a switching signal, which allows the driving voltage to be sequentially supplied to at least the first driving electrode and the second driving electrode of the plurality of driving electrodes, to a driver at each time when the internal touch sync signal falls, wherein the display device further comprises a plurality of driver switches in the driver, the driver switches connecting each of the driving electrodes to the common voltage supply or the driving voltage supply, wherein, according to the switching signal, at least two of the driver switches are sequentially connected to the driving voltage supply during the touch sensing period, and wherein, according to the switching signal, a driver switch connected to a driving electrode corresponding to gate lines to which the scan pulse is supplied is connected to the common voltage supply during an image display period.

* * * * *